United States Patent
Roberts et al.

(10) Patent No.: US 9,399,295 B2
(45) Date of Patent: Jul. 26, 2016

(54) SPACECRAFT CAPTURE MECHANISM

(71) Applicant: MACDONALD DETTWILER & ASSOCIATES INC., Brampton (CA)

(72) Inventors: Paul Roberts, Brampton (CA); Jason White, Nanaimo (CA); Steve Fisher, Schomberg (CA); Richard Rembala, Toronto (CA)

(73) Assignee: MACDONALD, DETTWILER AND ASSOCIATES INC., Brampton, ON (CA)

( * ) Notice: Subject to any disclaimer, the term of this patent is extended or adjusted under 35 U.S.C. 154(b) by 236 days.

(21) Appl. No.: 13/839,529

(22) Filed: Mar. 15, 2013

(65) Prior Publication Data

US 2013/0249229 A1 Sep. 26, 2013

Related U.S. Application Data

(60) Provisional application No. 61/612,715, filed on Mar. 19, 2012.

(51) Int. Cl.
*B25J 15/00* (2006.01)
*B25J 15/02* (2006.01)
(Continued)

(52) U.S. Cl.
CPC .............. *B25J 15/00* (2013.01); *B25J 15/0226* (2013.01); *B25J 19/0091* (2013.01); *B64G 1/1078* (2013.01); *B64G 1/646* (2013.01)

(58) Field of Classification Search
CPC ........ B64G 1/1078; B64G 1/646; B64G 4/00; B25J 15/00; B25J 15/0206; B25J 15/10; B25J 18/025; B25J 15/0009; B25J 15/0028; B25J 15/08; B25J 15/103; B25J 19/0091; B25J 15/0226
See application file for complete search history.

(56) References Cited

U.S. PATENT DOCUMENTS 3,346,929 A 10/1967 Webb
3,391,881 A * 7/1968 Maltby .................. B64G 1/646
244/1 R
(Continued)

FOREIGN PATENT DOCUMENTS

GB 1201749 8/1970
JP 04151400 A 5/1992
WO 2013138936 9/2013

OTHER PUBLICATIONS

Naasz, B., Satellite Servicing Capabilities Office, Second International Workshop on On-Orbit Satellite Servicing, May 30-31, 2012, NASA Goddard Space Flight Center, Greenbelt, MD (http://ssco.gsfc.nasa.gov/workshop_2012/Naasz_session%20presentation_final_2012_Workshop.pdf).
(Continued)

*Primary Examiner* — Valentina Xavier
(74) *Attorney, Agent, or Firm* — Lynn C. Schumacher; Stephen W. Leonard; Hill & Schumacher

(57) ABSTRACT

The present invention provides a capture mechanism for capturing and locking onto the Marman flange located on the exterior surfaces of spacecraft/satellites. The capture mechanism achieves its goal of quickly capturing a target spacecraft by splitting the two basic actions involved into two separate mechanisms. One mechanism performs the quick grasp of the target while the other mechanism rigidizes that grasp to ensure that the target is held as firmly as desired. The jaws can be set up to grasp gently, firmly, or even not close completely on the target. Once the jaws have sprung shut, a second mechanism draws the jaws (and their closing mechanism) back into the body of the tool pulling the captured target onto two rigidization surfaces. The mechanism keeps pulling backwards until a pre-established preload is reached at which point the target is considered suitably rigidized to the capture mechanism.

10 Claims, 15 Drawing Sheets

(51) Int. Cl.
  *B25J 19/00*  (2006.01)
  *B64G 1/10*  (2006.01)
  *B64G 1/64*  (2006.01)

(56) References Cited

U.S. PATENT DOCUMENTS

| | | | | |
|---|---|---|---|---|
| 3,820,741 | A * | 6/1974 | Ratcliff | B64G 1/646 244/172.4 |
| 4,195,804 | A * | 4/1980 | Hujsak | B64G 1/646 244/172.4 |
| 4,219,171 | A | 8/1980 | Rudmann | |
| 4,260,187 | A * | 4/1981 | Frosch | B64G 1/646 244/172.5 |
| 4,273,305 | A * | 6/1981 | Hinds | B64G 1/14 244/172.5 |
| 4,391,423 | A * | 7/1983 | Pruett | B64G 1/646 244/115 |
| 4,718,709 | A * | 1/1988 | Myers | B25J 15/103 244/172.4 |
| 4,810,019 | A * | 3/1989 | Brucher | B23Q 1/76 294/106 |
| 4,898,348 | A * | 2/1990 | Kahn | B64G 1/646 244/172.4 |
| 4,929,011 | A * | 5/1990 | Vandersluis | B64G 1/646 244/172.5 |
| 5,040,748 | A | 8/1991 | Torre et al. | |
| 5,094,410 | A * | 3/1992 | Johnson | B64G 1/646 244/172.4 |
| 5,735,626 | A | 4/1998 | Khatiblou et al. | |
| 6,840,481 | B1 * | 1/2005 | Gurevich | B64G 1/646 244/172.4 |
| 6,969,030 | B1 | 11/2005 | Jones et al. | |
| 7,070,151 | B2 * | 7/2006 | D'Ausilio | B64G 1/007 244/171.1 |
| 7,207,525 | B2 * | 4/2007 | Bischof | B25J 15/10 244/158.2 |
| 7,370,896 | B2 * | 5/2008 | Anderson | B25J 15/0009 294/106 |
| 7,828,249 | B2 * | 11/2010 | Ritter | B64G 1/646 24/595.1 |
| 7,857,261 | B2 * | 12/2010 | Tchoryk, Jr. | B64G 1/646 114/249 |
| 2005/0103940 | A1 * | 5/2005 | Bischof | B25J 15/10 244/172.4 |
| 2005/0178816 | A1 | 8/2005 | Stevenson et al. | |
| 2009/0173832 | A1 | 7/2009 | Hays et al. | |

OTHER PUBLICATIONS

Reed, B., Satellite Servicing Capabilities Office, In-Space Nondestructive Inspection Technology Workshop, Jan. 13, 2012 (http://www.nasa.gov/pdf/628324main_6-4_Reed.pdf).

International Search Report for PCT/CA2013/050227 mailed Jul. 25, 2013.

Nasa Tech Brief, Docking System Would Accommodate Misalignments. NTIS Tech Notes, US Department of commerce. Springfield, VA,US, Dec. 1, 1991, p. 921, XP000278878 ISSN: 0889-8464.

International Search Report in PCT/CA2015/050387 dated Aug. 24, 2015.

* cited by examiner

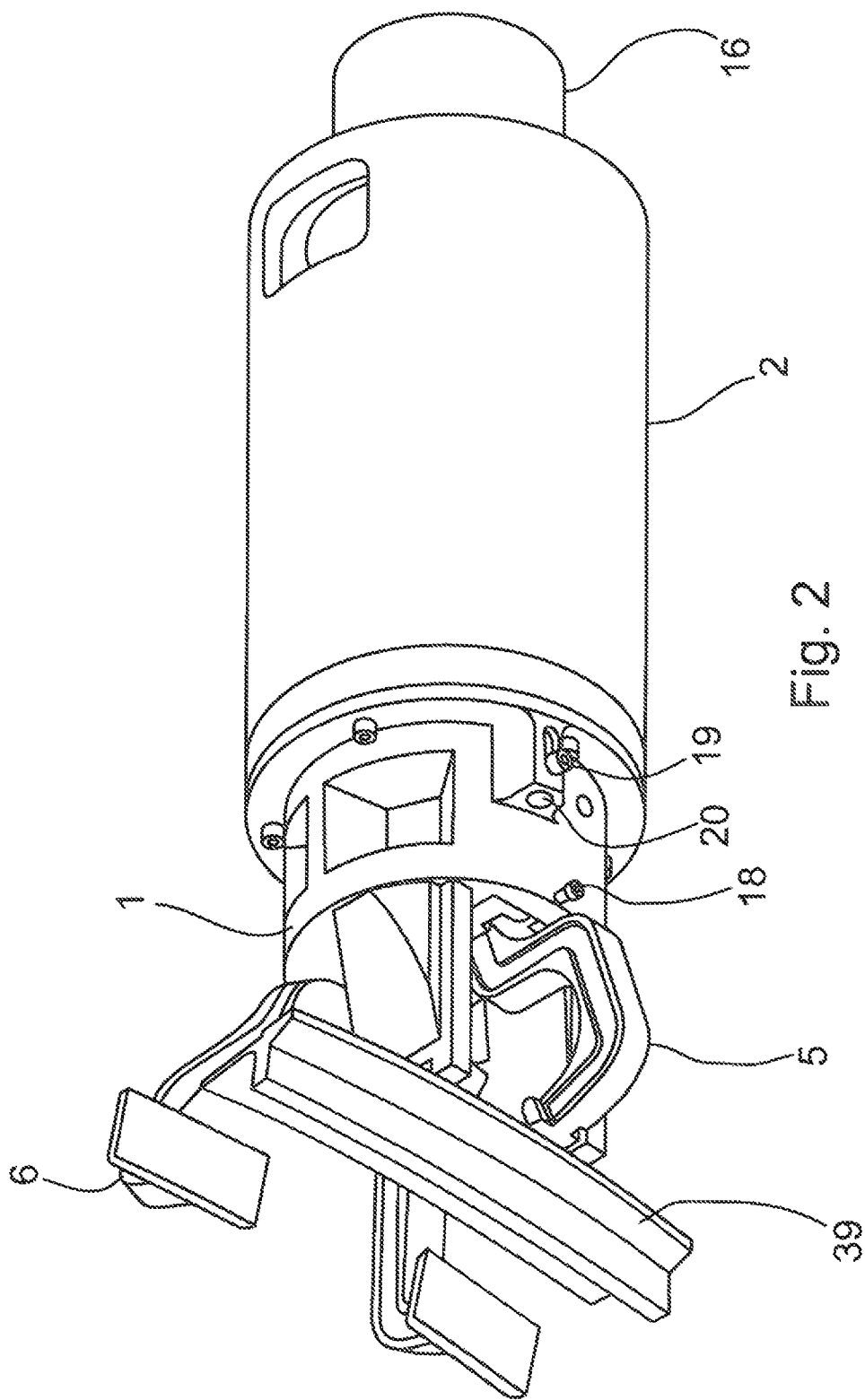

SPACECRAFT CAPTURE MECHANISM

FIELD OF THE INVENTION

The present invention relates to mechanisms for capturing spacecraft, and more particularly the present invention relates to a capture device for capturing and rigidising a bracket mounted on a spacecraft.

BACKGROUND OF THE INVENTION

Grappling free flying target objects in space involves systems which possess the following capabilities: acquiring the relative location of the target object's position is relative to the capture mechanism, establishing and tracking the relative motion of the target and capture mechanism, effecting a timely reduction in the relative separation between the two objects and then acting to capture the target object fast enough that it is grasped by the capture mechanism before the target moves out of the way on its own or is knocked away by the capture mechanism (an event known as "tip off"). The methods by which the relative positions and motions of the capture mechanism and the target object are established and tracked and the methods by which the capture mechanism is moved into position to capture are not part of this description. In general these may be accomplished through the orbital and attitude control of the capture spacecraft and in some cases augmented with manipulator arms which provide further dexterity and speed in the final stage of approach and positioning of the capture device with respect to the spacecraft which is to be captured, all these techniques are well known to those skilled in the art.

Capture mechanisms do however play a part in how large the relative movement can be between the target object and the capture mechanism. The faster the capture mechanism can perform an initial capture, the greater the relative motion can be between the two objects. This is because if the mechanism acts quickly enough, the target will have less time to move out of the way. For a given mechanism, the faster it works, the faster the relative motions can be between target object and capture mechanism. Providing a capture mechanism that permits a greater relative motion between the capture mechanism and the target object has significant benefits to both objects.

SUMMARY OF THE INVENTION

The capture mechanism disclosed herein is designed with a view to capturing several of the standard spacecraft Marman clamp flange interfaces (see attached interface documents for specific variations). The vast majority of satellites launched for Western customers, both commercial and military, use this interface due to its heritage and reliability. That said, the capture mechanism disclosed herein can be used to quickly capture other target spacecraft protrusions, the key criteria being the ability of the mechanism jaws to close on the protrusion from both sides and that, when closed, at least one side of the target protrusion has an extended profile that at least one of the two jaws can get behind with which to contain the target. Examples of potentially suitable target profiles would include, but not be limited to, personnel handles and grab rails, I-beams and C-channels, T-fittings, pipes, structural members, etc.

The capture mechanism achieves its goal of quickly capturing a target spacecraft by splitting the two basic actions involved into two separate mechanisms. One mechanism performs the quick grasp of the target while the other mechanism rigidises that grasp to ensure that the target is held as firmly as desired. To achieve a speedy grasp, the grasping action is powered by springs and an over-centre mechanism triggered either mechanically by a plunger or electronically by sensors and a solenoid. This forces two sets of jaws, one on either side of the object to be grasped, to close quickly over the target object. The jaws can be set up to grasp gently, firmly, or even not close completely on the target. The key is that they must close tightly enough so that the protrusions on the target cannot escape from the jaws due to any possible motions of the target. Once the jaws have sprung shut, a second mechanism draws the jaws (and their closing mechanism) back into the body of the tool pulling the captured target onto two rigidisation surfaces. The mechanism keeps pulling backwards until a pre-established preload is reached at which point the target is considered suitably rigidised to the capture mechanism.

Another embodiment includes a system for capturing a rail and or flange feature on a free flying spacecraft, comprising a) a capture mechanism including a two stage grasping tool including
  i) a quick grasp mechanism mounted for movement in a housing, said quick grasp mechanism configured to clamp said feature when said feature is in close proximity to, and triggers, said quick gasp mechanism to soft capture the feature;
  ii) a rigidizing mechanism configured to draw the quick grasp mechanism and soft captured feature into said housing till said feature abuts against a rigidisation surface located in said housing to rigidize the feature and spacecraft against said housing.

In this aspect the system may include a) a positioning device attached to the capture mechanism capable of positioning the capture mechanism into close proximity to the feature to trigger the quick grasp mechanism; and b) a sensing system for ascertaining a relative position of the capture mechanism and the feature.

In addition, the system may include a computer control system connected to said sensing system and programmed to position the capture mechanism in close proximity to said feature to trigger said quick grasp mechanism.

An embodiment of a capture mechanism disclosed herein includes a) a first housing section, a quick grasp mechanism mounted in said first housing section, said quick grasp mechanism including
  clamping jaws having proximal sections pivotally mounted to a front portion of said first housing section and extending outwardly from a front of said first housing section,
  a biasing mechanism located in said first housing section configured for biasing distal sections of the clamping jaws apart, the biasing mechanism including an elongate plunger mounted for reciprocal movement along an axis of the first housing section, the biasing mechanism including a cam mechanism pivotally mounted to said elongate plunger and configured to have a cam portion engage said clamping jaws to bias the distal sections of the clamping jaws apart when the elongate plunger is fully extended forward of the first housing section, the cam mechanism being configured so that when the elongate plunger contacts a bracket mounted to a spacecraft and is moved inwardly into said first housing section the cam mechanism pivots with respect to said elongate plunger causing the cam portions engaging said clamping jaws to move forward forcing the distal ends of the clamping jaws to pivot toward each other thereby capturing a portion of the bracket; and b) a second housing section mounted to a back of said first housing section, a rigidisation mechanism mounted in said second housing section, said rigidisation mechanism including a pulling mechanism connected to the elongate plunger configured to draw the elongate plunger and the clamping jaws further into the first housing section, the first housing section and cam mechanism being configured so that as the clamping jaws are withdrawn into the first housing section the cam portions engaging said clamping jaws are biased closer together, the pulling mechanism being configured to further pull the clamping mechanism into said first housing until a portion of the bracket abuts up against a rigidisation bracket to thereby rigidiize the captured spacecraft to the capture mechanism.

Another embodiment of a capture mechanism for capturing a bracket mounted to a spacecraft, comprises:

a) a first housing section, a quick grasp mechanism mounted in said first housing section, said quick grasp mechanism including clamping jaws having proximal sections pivotally mounted to a front portion of said first housing section and extending outwardly from a front of said first housing section, a biasing mechanism located in said first housing section configured for biasing distal sections of the clamping jaws apart, the biasing mechanism including an elongate plunger mounted for reciprocal movement along an axis of the first housing section, the biasing mechanism including a cam mechanism pivotally mounted to said elongate plunger and configured to have a cam portion engage said clamping jaws to bias the distal sections of the clamping jaws apart when the elongate plunger is fully extended forward of the first housing section, the cam mechanism being configured so that when the elongate plunger contacts a bracket mounted to a spacecraft and is moved inwardly into said first housing section the cam mechanism pivots with respect to said elongate plunger causing the cam portions engaging said clamping jaws to move forward forcing the distal ends of the clamping jaws to pivot toward each other thereby capturing a portion of the bracket; and b) a second housing section mounted to a back of said first housing section, a rigidisation mechanism mounted in said second housing section, said rigidisation mechanism including a pulling mechanism connected to the elongate plunger configured to draw the elongate plunger and the clamping jaws further into the first housing section, the first housing section and cam mechanism being configured so that as the clamping jaws are withdrawn into the first housing section the cam portions engaging said clamping jaws are biased closer together, the pulling mechanism being configured to further pull the clamping mechanism into said first housing until a portion of the bracket abuts up against a rigidisation bracket to thereby rigidiize the captured spacecraft to the capture mechanism; and c) a third housing, said first and second housings being reciprocally movable along a longitudinal axis of said third housing, said third housing including i) an extension mechanism for extending said first and second housing out of said third housing a predetermined distance, ii) a retraction mechanism for drawing said first and second housings back into said third housing, and iii) a locking mechanism for locking said first and second housings within said third housing.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 2 shows a perspective view of the capture mechanism of FIG. 1 but from a different perspective than shown in FIG. 1;

DETAILED DESCRIPTION OF THE INVENTION

Figure 1A:
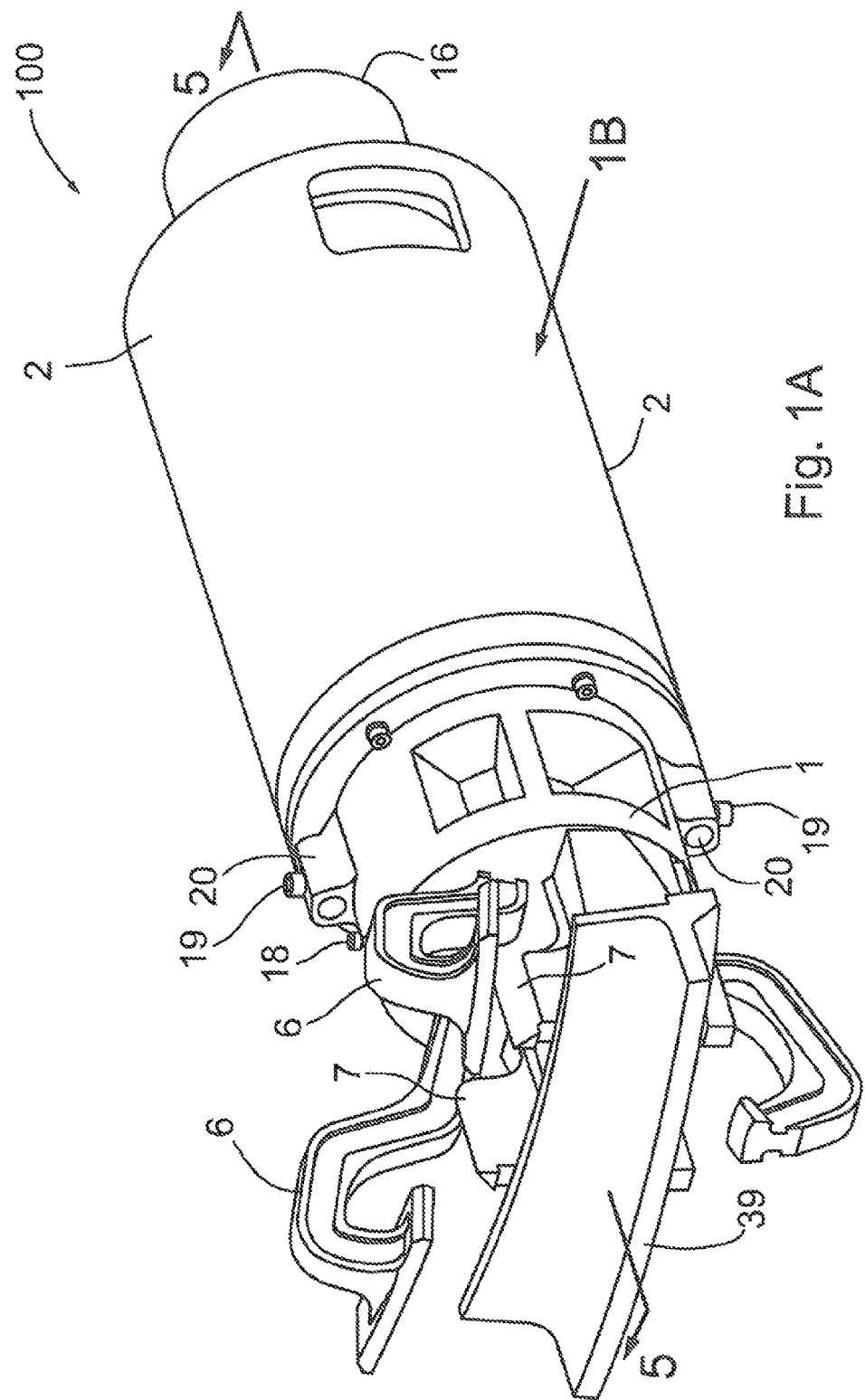
FIG. 1A shows a perspective view of the capture mechanism of the present invention in the open position and approaching a flange located on a spacecraft.

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

The capture device disclosed herein has been conceived to address two types of spacecraft/space object capture. In general, it is for capturing "non-prepared" objects. This refers to a class of client spacecraft which were not designed with purpose made features that would be used for later capture by a servicing spacecraft once the client spacecraft was in orbit. The capture device has been designed to capture through a grasping action natural features like launch adapter rings which are present on most spacecraft for the purposes of attachment to the launch vehicle prior to release on-orbit. Other natural features such as rails would also be applicable. A secondary feature of these non-prepared spacecraft for which this proposed capture device is intended is non-cooperative spacecraft. These are client spacecraft which are no longer under standard attitude control with the spacecraft no longer held in a stable attitude, but are instead are tumbling, i.e. rotating in one or more axis with respect to their desired pointing direction. In non-tumbling capture, the rendezvousing servicer spacecraft generally is moving relative to the client on a single axis of motion. In capturing a tumbling spacecraft, the servicer spacecraft and/or its manipulator arm must close the separation between it and the client in a number of axes. This puts a premium on the capture device being able to quickly grasp the tumbling spacecraft in what is a much narrower capture zone time, generally limited by the responsiveness of the spacecraft attitude and orbital control system and the responsiveness and peak rates of the manipulator arm.

The pool of viable targets will increase with the capture mechanism mechanism's ability to more quickly capture a mechanical feature on the client over a larger range of relative motion. In addition, the spacecraft carrying the capture mechanism will not have to control its own position as precisely, which will result in less propellant being needed and less precise avionics needing to be developed resulting in lower overall mission costs.

This premium on quickly grasping the client which is potentially tumbling presents a challenge for typical robotic grippers. They must quickly close, yet produce a sufficiently high applied gripping load to ensure that the captured spacecraft remains grasped as forces/moments develop at that interface as the servicer spacecraft and manipulator arrests the relative motion of the client. This presents a challenge for typical single action gripping devices which generally use some sort of gearing or transmission in the clamping action. In space systems, this gearing is needed because there is a need for lightweight actuators. As the gearing is increased to compensate for the low torque of the actuator, the penalty is a lower closure rate. This design trade-off in single action robotic grippers is a primary motivation for the two stage, capture device disclosed.

Broadly speaking, the capture mechanism disclosed herein achieves its goal of quickly capturing a target spacecraft by splitting the two basic actions involved into two separate mechanisms. One mechanism performs the quick grasp of the target while the second mechanism rigidises that grasp to ensure that the target is held as firmly as desired. To achieve a speedy grasp, the grasping action is powered by springs and an over-centre mechanism triggered either mechanically by a plunger or electronically by sensors and a solenoid. This forces two sets of jaws, one on either side of the object to be grasped, to close quickly over the target object. The jaws can be configured to grasp gently, firmly, or even not close completely on the target. However it is preferred that they close tightly enough so that the protrusions on the target cannot escape from the jaws due to any possible motions of the target. Once the jaws have sprung shut, a second mechanism draws the jaws (and their closing mechanism) back into the body of the tool thereby pulling the captured target onto two rigidisation surfaces. The mechanism keeps pulling backwards until a pre-established preload is reached at which point the target is considered suitably rigidised to the capture mechanism.

PARTS LIST

This embodiment of the capture mechanism tool is comprised of the following parts:
1. capture mechanism housing
2. rigidisation mechanism housing
3. rigidisation mechanism mount
4. trigger plunger
5. single jaw
6. double jaw
7. rigidisation bracket (quantity of 2)
8. motor bracket (quantity of 2)
9. motor
10. gearbox
11. collet
12. rigidisation drive shaft
13. rigidisation drive nut
14. rigidisation drive nut spacer
15. rigidisation drive spacer retaining ring
16. mechanism mount
17. mechanism mount fastener
18. capture mechanism stop pin (quantity of 2)
19. capture mechanism return pin (quantity of 2)
20. capture mechanism return spring (quantity of 2)
21. capture mechanism cam (quantity of 2)
22. cam drive link (quantity of 2)
23. plunger drive pin
24. cam drive link pivot pin (quantity of 2)
25. cam drive spring support pin (quantity of 2)
26. cam drive pin (quantity of 2)
27. plunger draw bar
28. plunger draw bar bolt (quantity of 2)
29. plunger draw bar nut (quantity of 2)

30. rigidisation preload bushing
31. rigidisation preload spring
32. rigidisation preload washer
33. rigidisation preload spring screw
34. capture mechanism frame (quantity of 2)
35. cam drive spring access plate (quantity of 2)
36. cam drive spring (quantity of 2)
37. jaw hinge pin (quantity of 2)
38. plunger reset stop ring
39. target Marman flange
40. target spacecraft The structure of the capture mechanism will first be described and particular reference is to a feature on most spacecraft named a Marman flange but it will be understood the present capture mechanism is configured to capture any available feature on a spacecraft not necessarily intended to be grasped. Referring to FIGS. 1A, 1B, 2, 3 and 4, capture mechanism shown generally at 100 includes a capture mechanism housing 1, a rigidisation mechanism housing 2, and a rigidisation mechanism mount 3. The capture mechanism 100 includes a single jaw 5 in opposition to a double jaw 6 which are shown in the open position. Two rigidisation brackets 7 are located in the vicinity of jaws 5 and 6 and provide outer surfaces 70 against which a Marman bracket 39 abuts once it has been captured. At the other end of the housing opposite jaws 5 and 6 is located a capture mechanism mount 16. This mount is used to attach the capture mechanism to the end of a manipulator arm. Located in front of the rigidisation mechanism mount 3 are two capture mechanism return pins 19 located on opposite sides of the housing 1 from each other. Associated with each of the return pins 19 is a capture mechanism return spring 20 located in housings below pins 19. At the front of the capture mechanism housing 1 are two capture mechanism stop pins 18 each one located in front of one of the pins 19. A mount 72 is located on rigidisation mechanism housing 2.

Figure 1B:
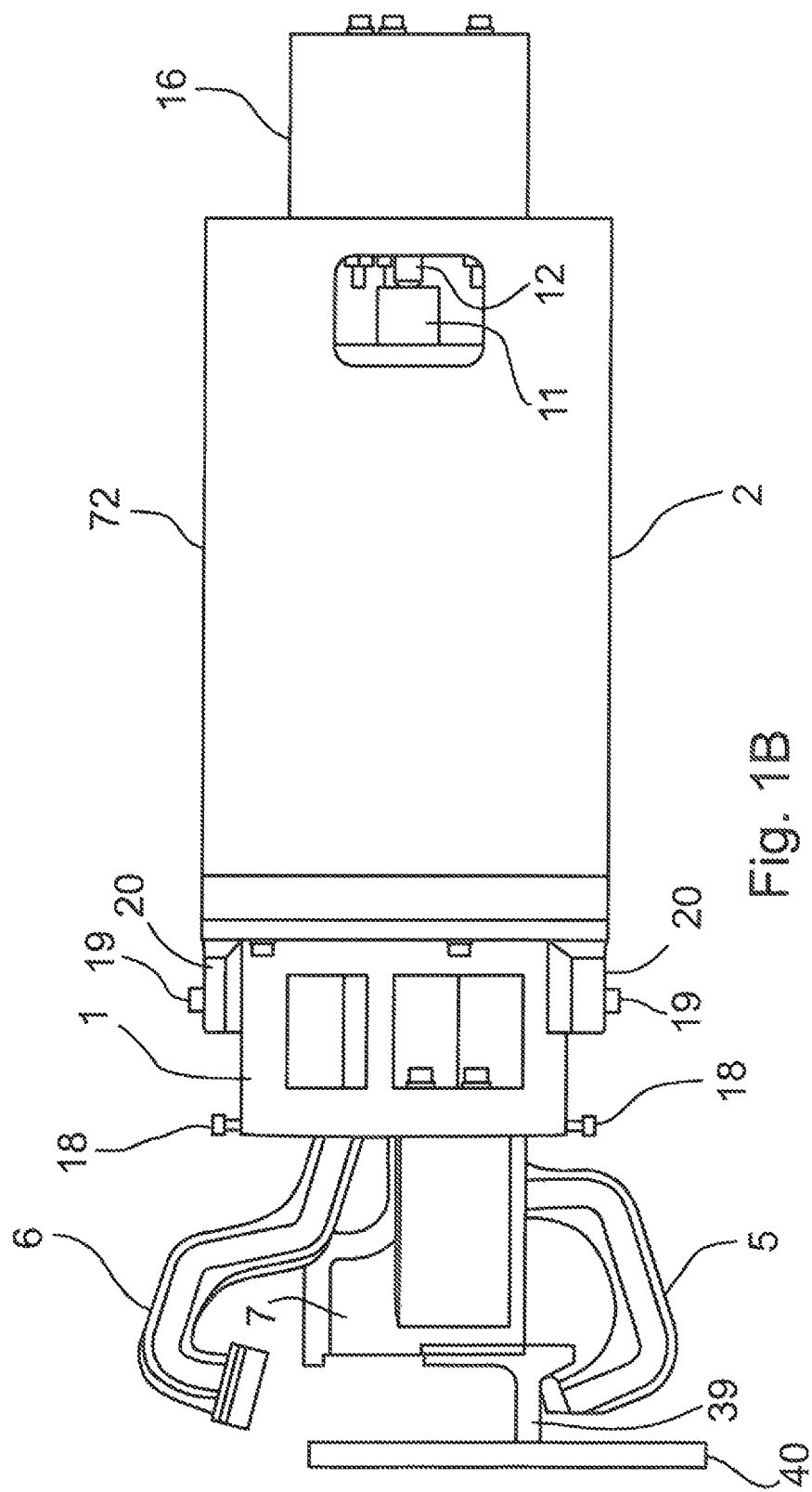
FIG. 1B is a side view of the capture mechanism of FIG. 1A in the open position.
Figure 3:
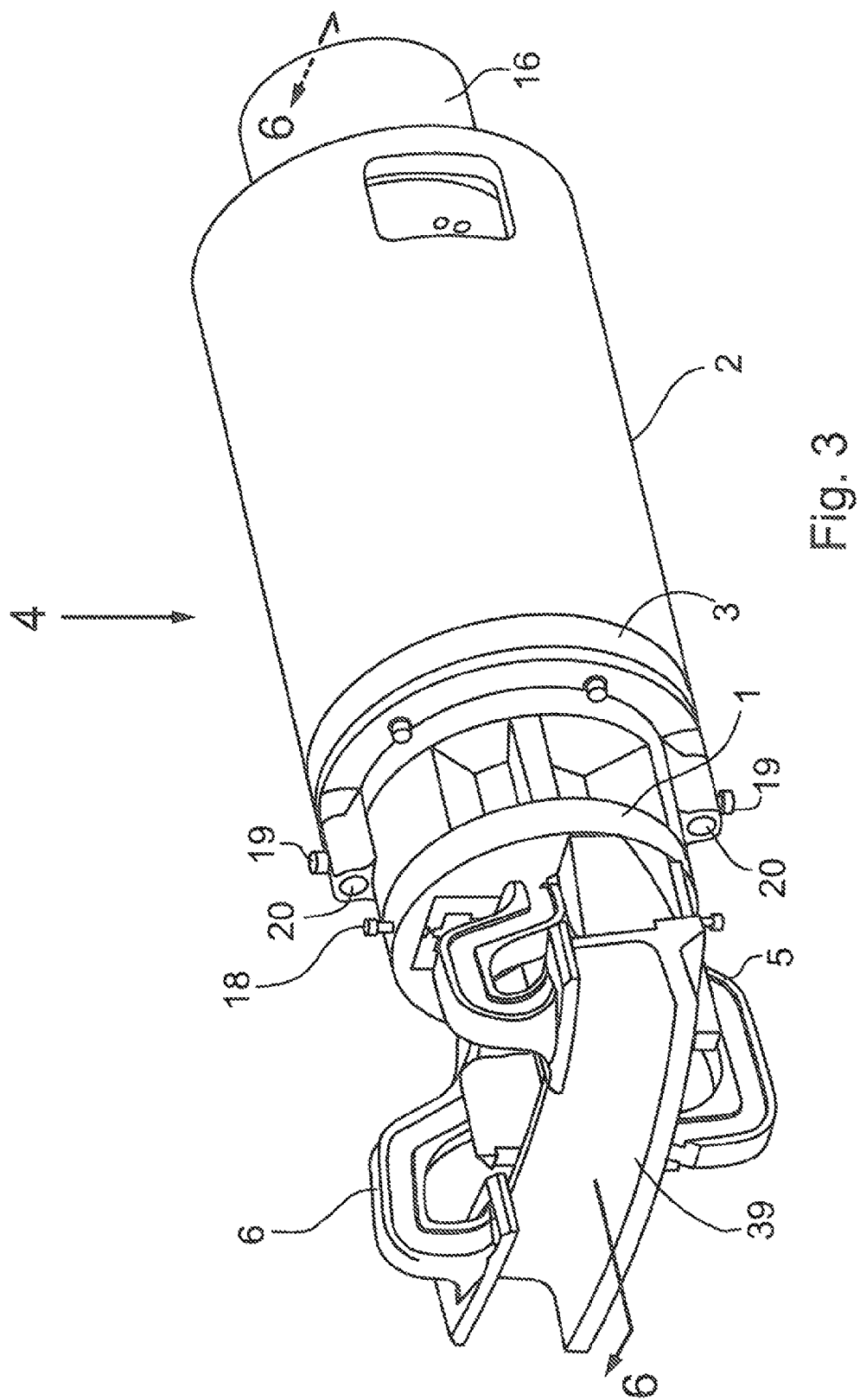
FIG. 3 is a perspective view similar to FIG. 1 but with the being grasped by the capture mechanism which is in the closed position.
Figure 4:
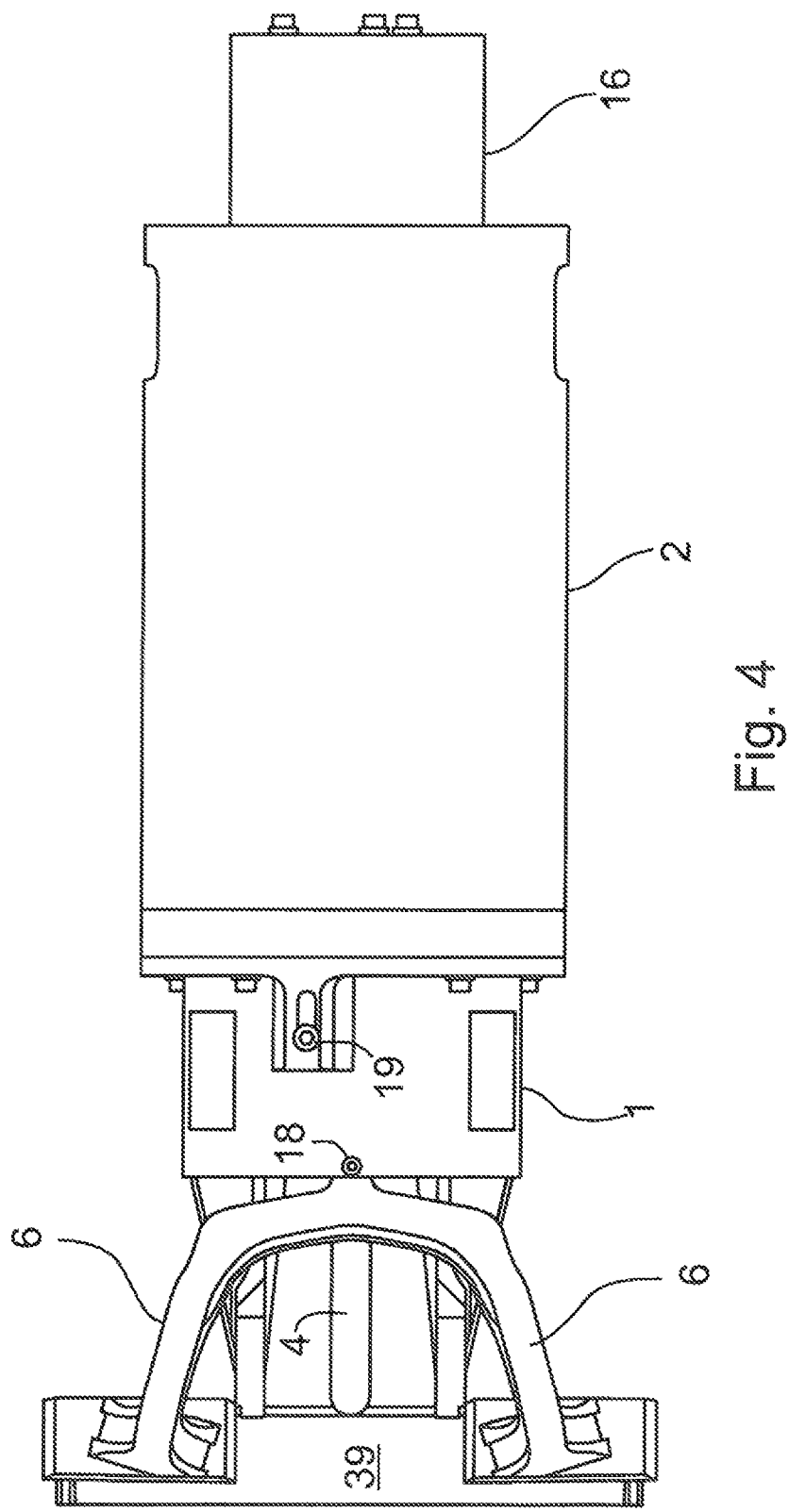
FIG. 4 is a top view of the capture mechanism taken along arrow 4 of FIG. 3.

FIGS. 1A, 1B and 2 show the capture mechanism in the open and armed position ready to capture a Marmam bracket 39, while FIGS. 3 and 4 show the capture device 100 closed after capturing the Marman bracket 39.

Figure 5:
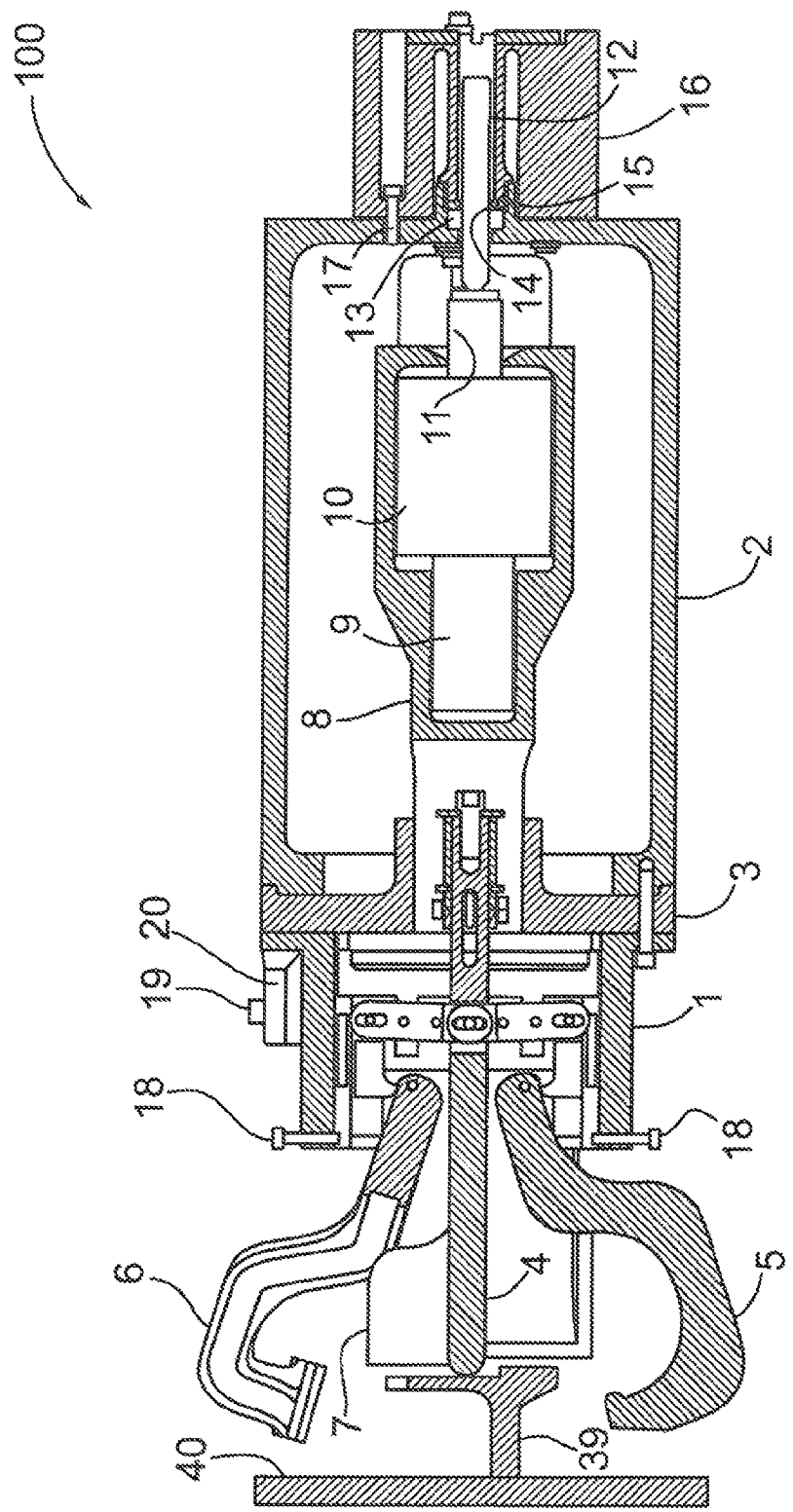
FIG. 5 is a partial cross sectional of the capture mechanism in the open position taken along line 5-5 of FIG. 1A.
Figure 6:
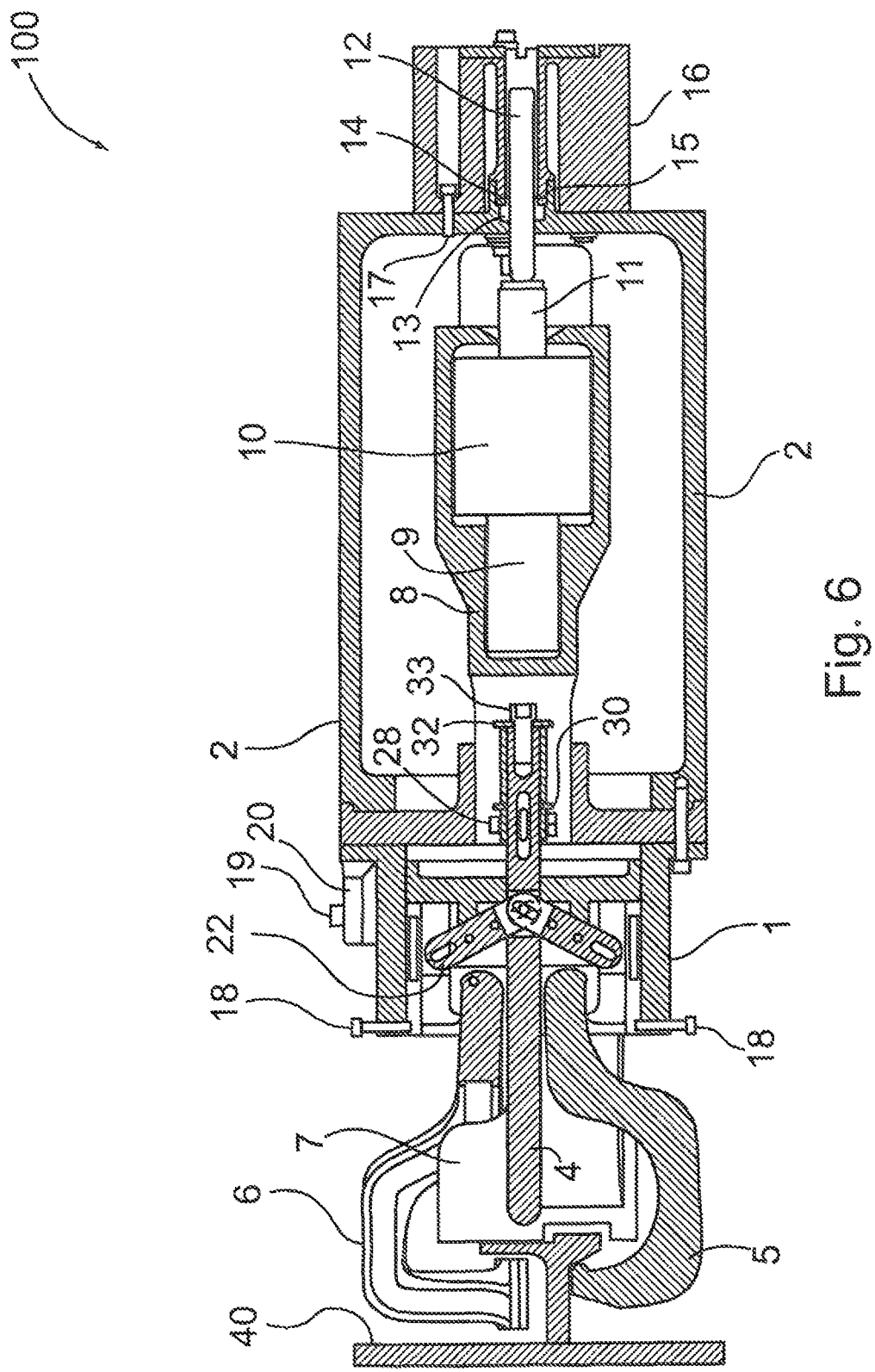
FIG. 6 is a partial cross sectional of the capture mechanism in the closed position taken along line 6-6 of FIG. 3.

Referring now to FIGS. 5 and 6, the capture mechanism 100 includes two motor brackets 8, a motor 9 mounted to brackets 8, a gearbox 10 coupled with motor 9, a collet 11 coupled to the gearbox 10, a rigidisation drive shaft 12 coupled to collet 11, a rigidisation drive nut 13 surrounding drive shaft 12, a rigidisation drive nut spacer 14 and a rigidisation drive spacer retaining ring 15. Rigidisation drive shaft 12 reciprocates back and forth in the rigidisation mechanism housing 2 and rigidisation drive nut 13, rigidisation drive nut spacer 14 and ring 15 are located in the mechanism mount 16. The mechanism mount fasteners 17 secure mechanism mount 16 to rigidisation mechanism housing 2.

Figure 7:
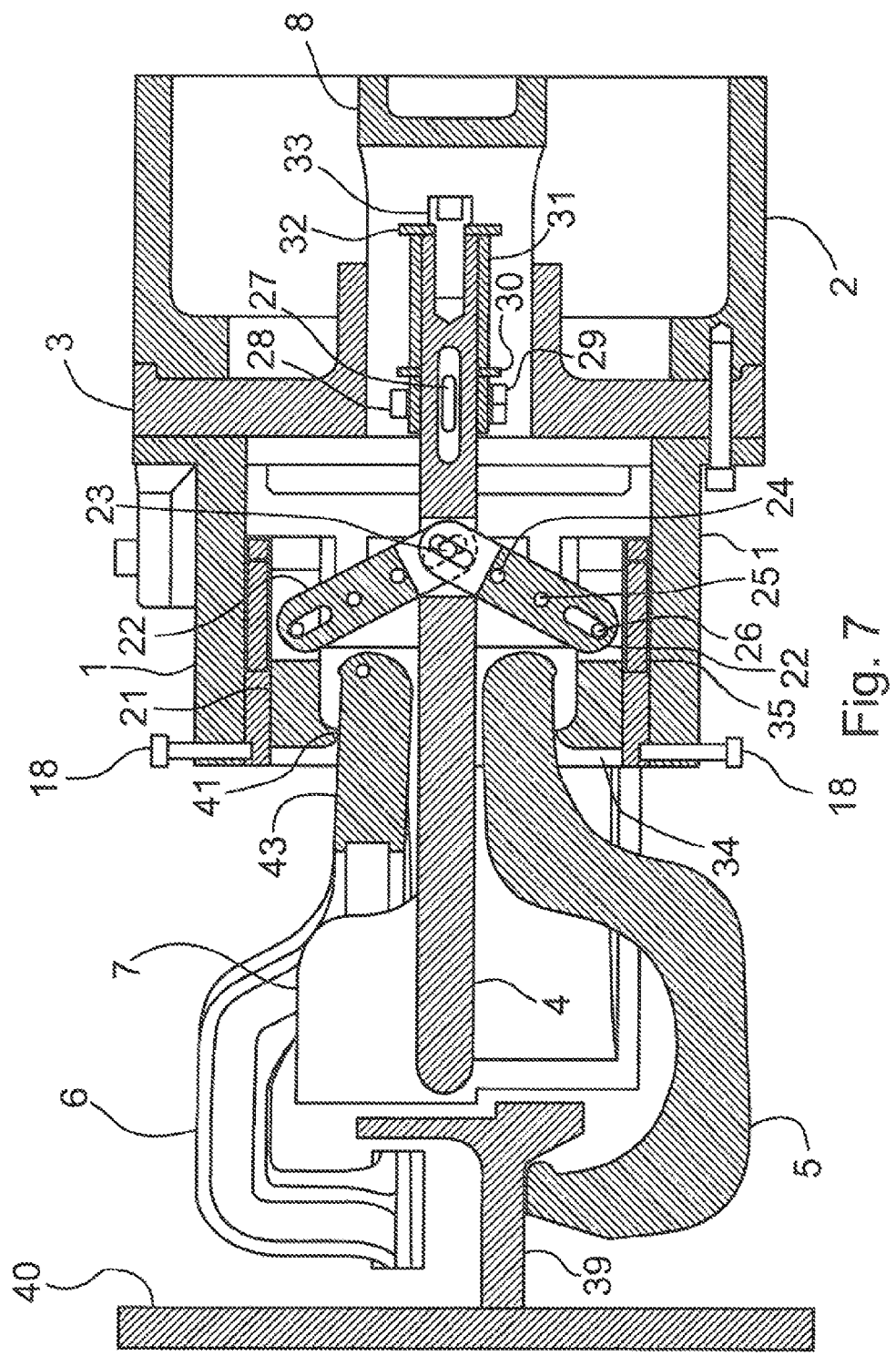
FIG. 7 is an expanded view of the cross section of FIG. 6 showing the clamping jaw portion with the clamping jaws in the closed position and showing details of the retraction mechanism.
Figure 8:
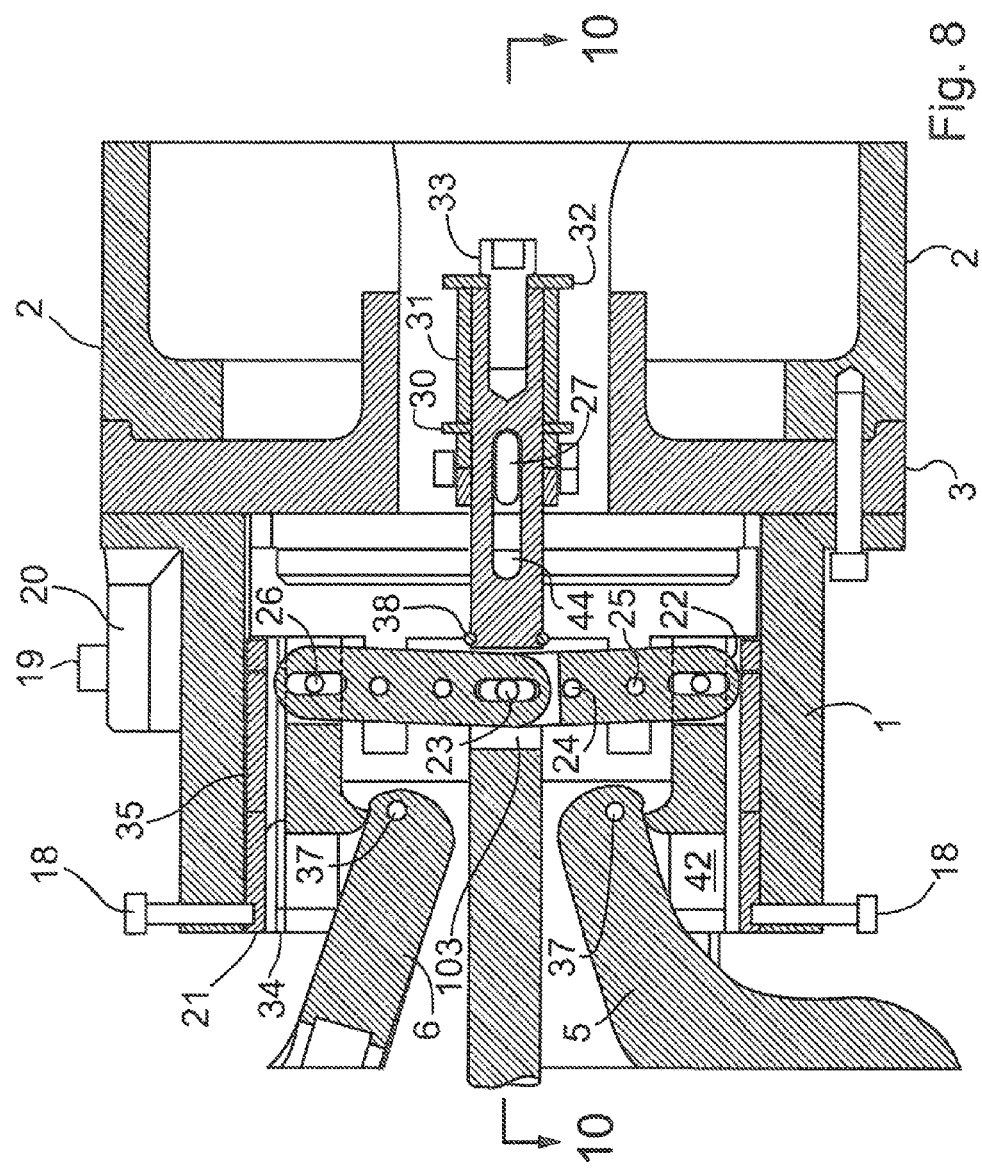
FIG. 8 is an expanded view of the cross section of FIG. 5 of the clamping jaw portion with the clamping jaws in the open position.
Figure 9:
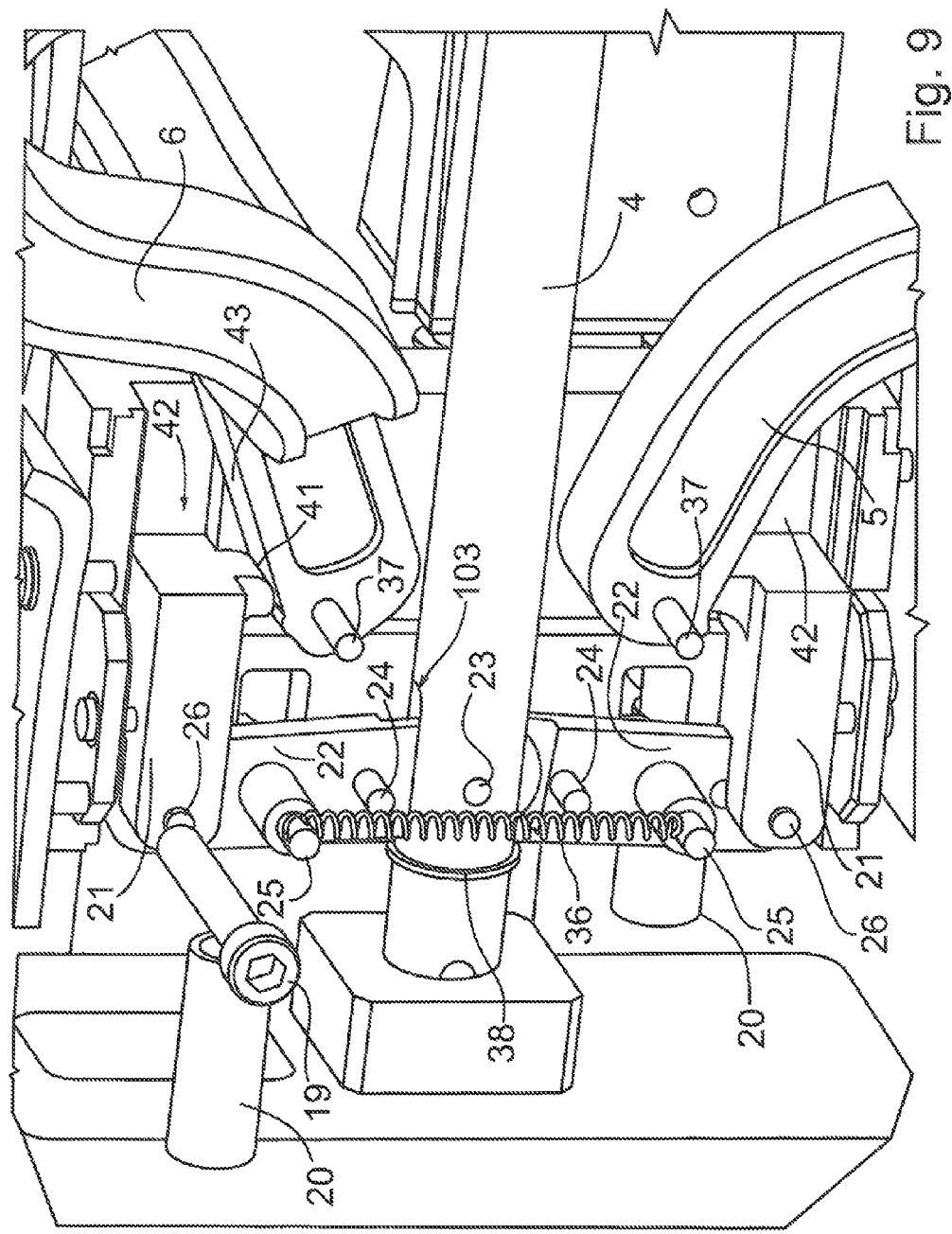
FIG. 9 is a perspective view of the capture mechanism shown in cross section in FIG. 8 with the jaws in the open position and absent a cam drive link so that the cam drive springs can be seen.

Referring to FIGS. 7 and 8, details of the structure of the capture mechanism are shown. The capture mechanism includes:
two capture mechanism cams 21,
two cam drive links 22
plunger drive pin 23
two cam drive link pivot pins 24
two cam drive spring support pins 25
two cam drive pins 26
plunger draw bar 27
two plunger draw bar bolts 28
two plunger draw bar nuts 29
rigidisation preload bushing 30
rigidisation preload spring 31
rigidisation preload washer 32
rigidisation preload spring screw 33
two capture mechanism frames 34
two cam drive spring access plates 35
two cam drive springs 36 (only visible in FIG. 9)
two jaw hinge pins 37
plunger reset stop ring 38

The two capture mechanism frames 34 serve to structurally contain and support the main components of the capture mechanism 100 and are fastened together as a unit prior to being inserted with the capture mechanism housing 1. Within the two frames 34 the two cam drive links 22 are interleaved, and retained within a slot 103 (see FIGS. 8 and 9) in the trigger plunger 4 by the plunger drive pin 23. The trigger plunger 4 and cam drive links 22 sit within the frames 34 with the plunger 4 free to reciprocate fore and aft and the two cam drive links 22 pivoting about two cam drive link pivot pins 26 fixed within the frames 34. The other ends of the two cam drive links 22 are connected by the cam drive pins 26 to the two capture mechanism cams 21. The capture mechanism cams sit within guide slots 42 (FIG. 8) forming part of the surface of the frames 34. Slots in the cam drive links 22 permit the capture mechanism cams 21 to slide fore and aft as the cam drive links 22 rotate about the cam drive link pivot pins 26. A cam drive spring support pin 25 is inserted in each cam drive link 22 and these act to hold the two cam drive springs 36 (one being shown in FIG. 9). These tension springs 36 act upon the cam drive links 22 and act in such a way to bring the cam drive support pins 25 closer together. This spring force creates a moment around the cam drive link pivot pins 26 to operate the mechanism. To provide access to the two cam drive springs 36 there are two cam drive spring access plates 35, one each for the top and bottom of the mechanism.

The capture mechanism cams 21 are in contact at point 41 with the single jaw 5 and double jaw 6 along a specifically devised follower surface 43 on the two jaws. As the capture mechanism cams 21 move fore and aft the forces on the single and double jaws 5 and 6 cause them to rotate around the jaw hinge pins 37 which hold the jaws 5 and 6 into the capture mechanism 100. The shape of the surface combined with the contact of the capture mechanism cams 21 controls the opening and closing of the two jaws 5 and 6. Jaw motion speeds, the extent of closure and the mechanical advantage of the jaw closing action is controlled by varying the interaction between the cam surface 41 and the jaw follower surfaces 43.

The plunger draw bar 27 extends through slot 44 in the trigger plunger 4 and is connected to the motor brackets 8 by a bolt 28 and nut 29 on each side. Aft of the plunger draw bar 27 are, in order, the rigidisation preload bushing 30, the rigidisation preload spring 31 and the rigidisation preload washer 32 all fastened to the trigger plunger 4 by the rigidisation preload spring screw 33. The rigidisation preload bushing 30, the rigidisation preload spring 31, the rigidisation preload washer 32 and the rigidisation preload spring screw 33 serve to even out the loads imposed by the plunger draw bar 27 on the trigger plunger 4 during rigidisation, These parts also serve to compensate for any variations in component axial dimensions due to differential thermal growth should the temperature of the mechanism 100 change.

Figure 10:
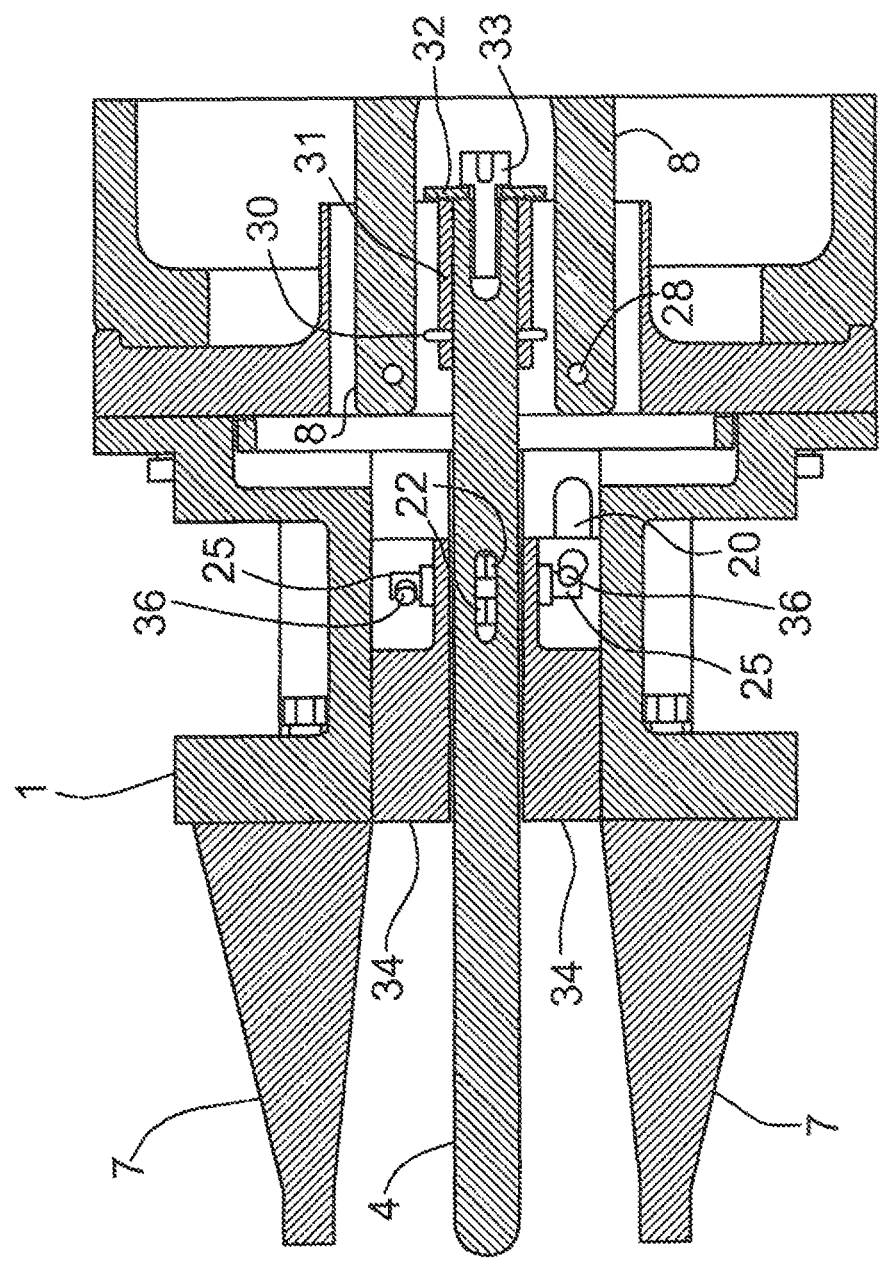
FIG. 10 is a partial cross sectional diagram taken along the line 10-10 of FIG. 8.
Figure 11:
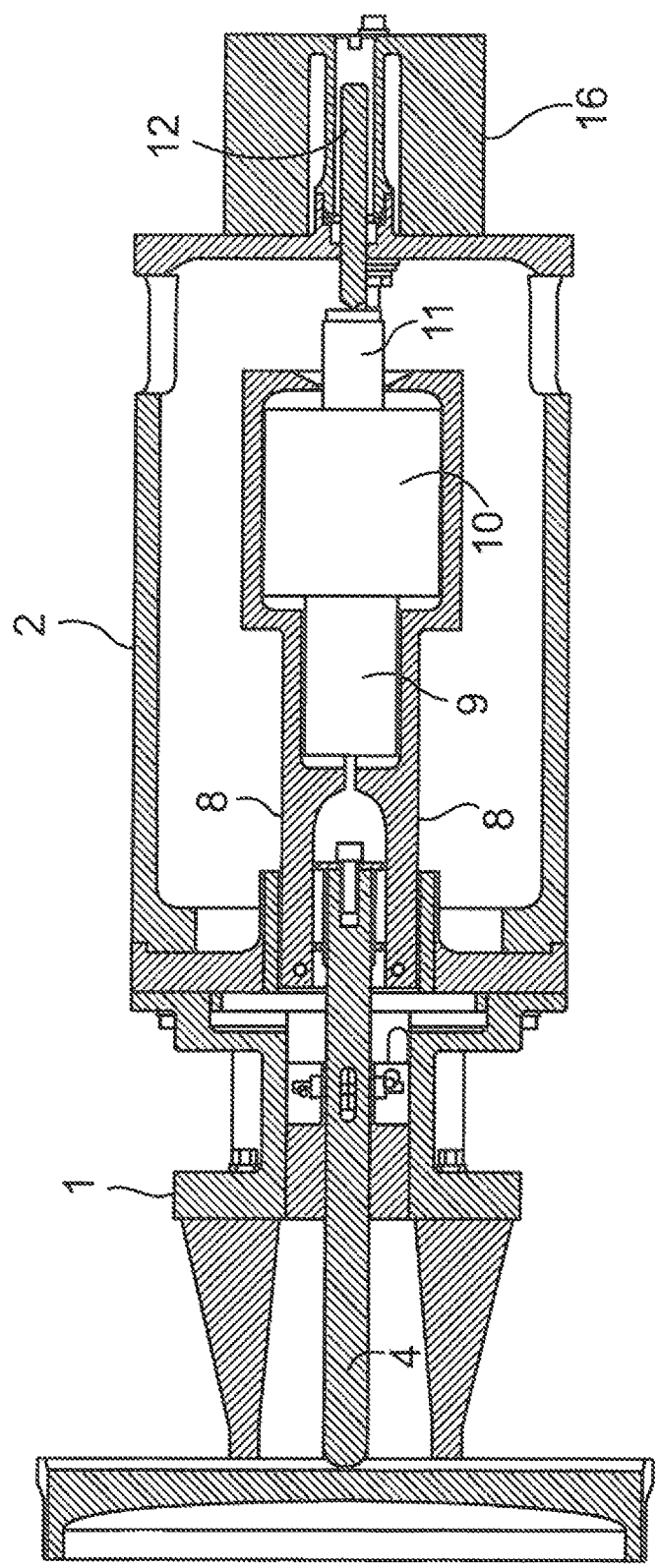
FIG. 11 is a full cross sectional diagram taken along line 10-10 of FIG. 8d.

The plunger reset stop ring 38 is installed into a groove in the trigger plunger 4 in such a way that it acts as a final stop to the mechanism when it is being reset. When the plunger reset stop ring 38 contacts the aft face of the assembled capture mechanism frames 34 it provides a signal to a control system that the mechanism has been pushed forward as far as it can go. The control system then commands the motor 9 to drive the trigger plunger 4 aft a predetermined distance to create the correct operating clearance in front of the plunger draw bar 27 within slot 44 and the capture mechanism 100 is reset and ready to capture another feature Referring to FIGS. 9, 10 and 11 and given that the capture mechanism frames are free to reciprocate with the capture mechanism housing, the capture mechanism return springs 20 acts upon the capture mechanism return pins 19 which are fastened to the two capture mechanism frames 34 to bias the quick grasp mechanism in housing 1 into the forward position, aligned and ready for capture. These springs 20 ensure that the mechanism is operated in the correct sequence and that the capture mechanism frames remain in the correct axial position.

Figure 15:
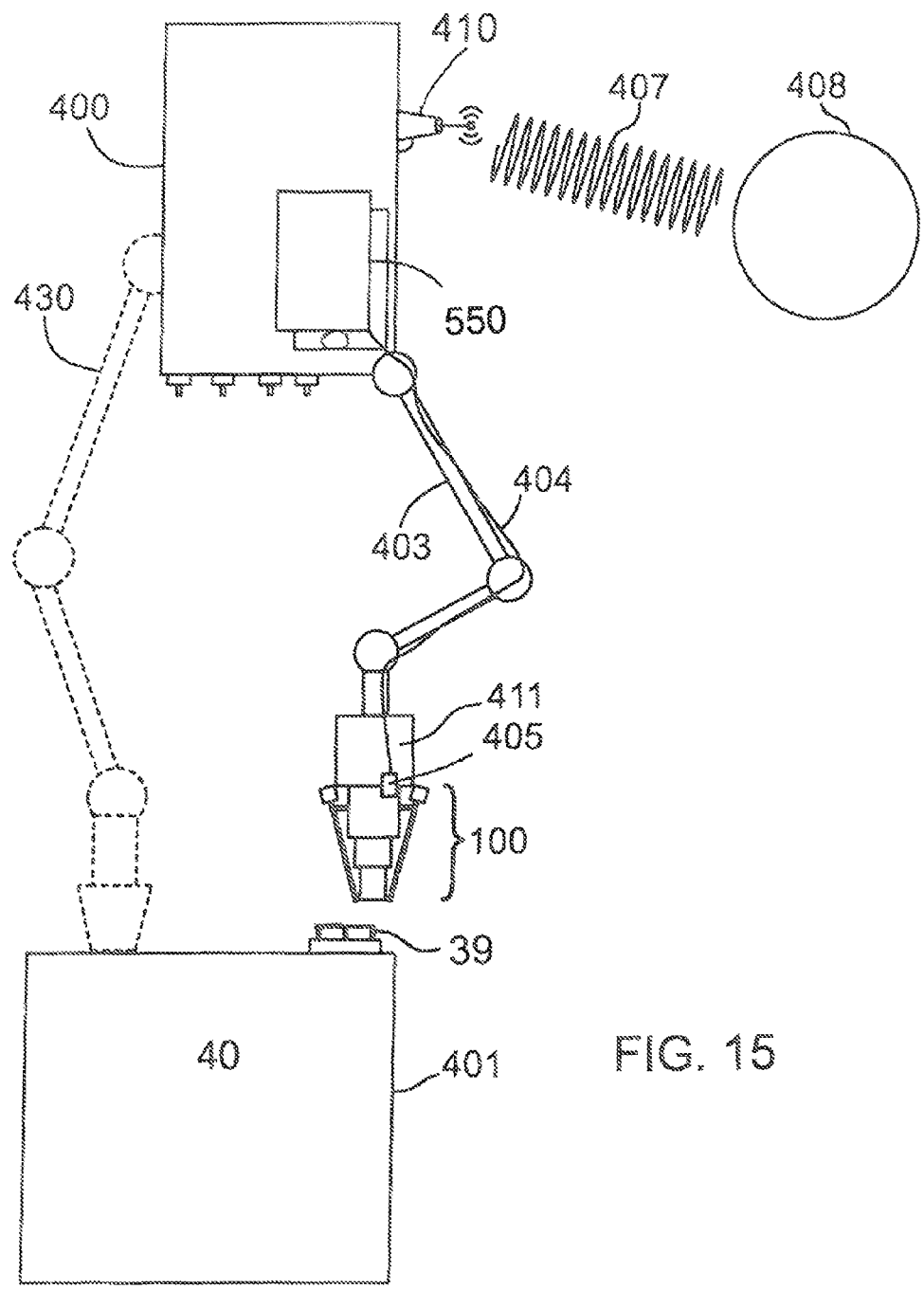
FIG. 15 is a block diagram showing a servicing satellite equipped with the present capture mechanism for capturing a satellite.

FIG. 15 is a block diagram showing those items pertaining to the capture of a client satellite in addition to the capture mechanism 100. These include the host servicer spacecraft 400, the client satellite 40 with bracket 39 to be captured, a robotic arm 403, an end effector 411 coupled to the robotic arm 403, to which the capture mechanism 100 is interfaced and releasibly gripped by the end effector 411, and a communication system 410 to provide a two-way radio link 407 to Earth 408 (or space station or mother ship-whichever is the location of the teleoperation control).

In addition, the servicer spacecraft 400 includes an onboard computer control system 500 (see FIG. 16) which may be interfaced with the capture mechanism 100, so that it can coordinate all the components that are involved in the capture process, including the vision system 550, robotic arm(s) 403 (if more than one capture mechanism 100 is used). This control system is also interfaced with any sensors used to determine the position and loading state of the software capture or rigidize mechanisms. These sensors may include contact or non-contact sensors used to trigger the quick grasp mechanism (in lieu of the plunger) and position sensors to determine the degree of closure of the mechanisms using continuous means (encoders or resolvers) or discretely (using limit switches). With the presence of the computer control system 500 interfaced with the capture mechanism 100, the capture process may be autonomously controlled by a local Mission Manager or may include some levels of supervised autonomy so that in addition to being under pure teleoperation there may be mixed teleoperation/supervised autonomy.

Figure 16:
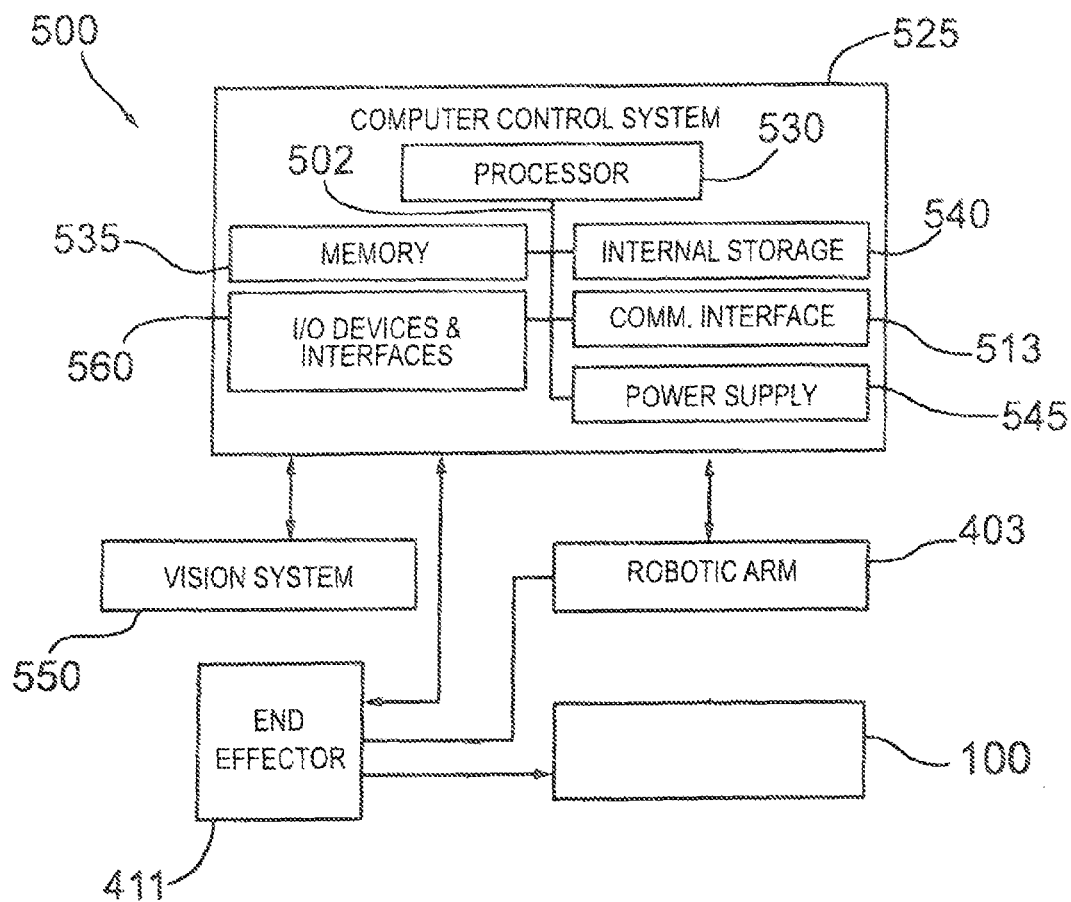
FIG. 16 shows a non-limiting exemplary example of a computer control system that may be used to control the actions of the robotic tool.

Referring now to FIGS. 15 and 16, an example computing system 500 forming part of the propellant resupply system is illustrated. The system includes a computer control system 525 configured, and programmed to control movement of the robotic arm 403 during the entire procedure of capturing flange 39 on the client satellite 40.

The command and control system is also configured to control movement of the robotic arm 403 and the end effector 411 attached thereto for controlling the action of the capture mechanism 100. This may be the same command and control system that is interfaced with the capture mechanism, for example a computer mounted on the servicer satellite which is programmed with instructions to carry out all operations needed to be performed by the servicer satellite during approach, capture/docking with the client satellite and refueling operations. It may also be a separate computer system.

Communication system 410 is interfaced with the robotic arm 403 and configured to allow remote operation (from the Earth 408 or from any other suitable location) of the vision system 550 (which may include one or more cameras), the robotic arm 403 and hence the tools. The vision system 550 may include distinct markers mounted on capture mechanism 100.

In one form, the vision system 550 may include one or more video cameras. To improve depth perception, it may be augmented with a range finding device, such as a laser range finder or radar. The cameras of vision system 550 may be used within a telerobotic control mode where an operator controlling the servicing actions on earth or from some other remote location views distinct views of the worksite on display screens at the command and control console. In an alternative mode, the position of elements of the tool 100 or flange 39 may be determined by either a stereo camera and vision system which extracts 3D points and determines position and orientation of mechanism 100 or other relevant features on the flange 39, satellite 401 or capture mechanism 100 from which the robotic arm 403 can be driven to desired locations according the sensed 6 degree-of-freedom coordinates. It should be noted that the term position in the context of the positioning of the servicing spacecraft with respect to the spacecraft to be captured includes the orientation of the object as well as the translation vector between the two objects, i.e. the overall relative pose of the capture feature on the client spacecraft with respect to servicer spacecraft.

The stereo camera could also be replaced with a scanning or flash lidar system from which desired 6 degree-of-freedom coordinates could be obtained by taking measured 3-D point clouds and estimating the pose of desired objects based on stored CAD models of the desired features or shapes on the refueling worksite. For those applications where the spacecraft was designed with the intention to be serviced, a simple target such as described in Ogilvie et al. (Ogilvie, A., Justin Allport, Michael Hannah, John Lymer, "Autonomous Satellite Servicing Using the Orbital Express Demonstration Manipulator System," Proc. of the 9th International Symposium on Artificial Intelligence, Robotics and Automation in Space (i-SAIRAS '08), Los Angeles, Calif., Feb. 25-29, 2008) could be used in combination with a monocular camera on the servicing robotics to locations items of interest. Finally, the robotic arm or device used to position the capture mechanism 100 may include a sensor or sensors capable of measuring reaction forces between the capture tool and the bracket being captured. These can be displayed to the operator to aid the operator in tele-operation control or can be used in an automatic force-moment accommodation control mode, which either aids a tele-operator or can be used in a supervised autonomous control mode.

As mentioned above, computer control system 525 is interfaced with vision system 550 and robotic arm 403. Previously mentioned communication system 410 is provided which is interfaced with the robotic arm 403 and configured to allow remote operation (from the Earth 408 or from any other suitable location) of the vision system 550 (the robotic arm 403, robotic end effector 411, and capture mechanism 100. A system of this type is very advantageous particularly for space based systems needing remote control.

The end effector 411 possesses its own embedded processor (as does the robotic arm 403) and receives commands from the servicing spacecraft computer. The end effector 411 also passes power and data from the central computer through to the capture mechanism 100 in the event there are sensors of any type, gauges or other power requiring devices.

Some aspects of the present disclosure can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

FIG. 16 provides an exemplary, non-limiting implementation of computer control system 525, forming part of the command and control system, which includes one or more processors 530 (for example, a CPU/microprocessor), bus 502, memory 535, which may include random access memory (RAM) and/or read only memory (ROM), one or more internal storage devices 540 (e.g. a hard disk drive, compact disk drive or internal flash memory), a power supply 545, one more communications interfaces 410, and various input/output devices and/or interfaces 555.

Although only one of each component is illustrated in FIG. 18, any number of each component can be included computer control system 525. For example, a computer typically contains a number of different data storage media. Furthermore, although bus 502 is depicted as a single connection between all of the components, it will be appreciated that the bus 502 may represent one or more circuits, devices or communication channels which link two or more of the components. For example, in personal computers, bus 502 often includes or is a motherboard.

In one embodiment, computer control system 525 may be, or include, a general purpose computer or any other hardware equivalents configured for operation in space. Computer control system 525 may also be implemented as one or more physical devices that are coupled to processor 530 through one of more communications channels or interfaces. For example, computer control system 525 can be implemented using application specific integrated circuits (ASIC). Alternatively, computer control system 525 can be implemented as a combination of hardware and software, where the software is loaded into the processor from the memory or over a network connection.

Computer control system 525 may be programmed with a set of instructions which when executed in the processor causes the system to perform one or more methods described in the present disclosure. Computer control system 525 may include many more or less components than those shown.

While some embodiments have been described in the context of fully functioning computers and computer systems, those skilled in the art will appreciate that various embodiments are capable of being distributed as a program product in a variety of forms and are capable of being applied regardless of the particular type of machine or computer readable media used to actually effect the distribution.

A computer readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. In general, a machine readable medium includes any mechanism that provides (i.e., stores and/or transmits) information in a form accessible by a machine (e.g., a computer, network device, personal digital assistant, manufacturing tool, any device with a set of one or more processors, etc.). Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like.

The present system is also configured for full autonomous operation. A fully autonomous system is a system that measures and responds to its external environment; full autonomy is often pursued under conditions that require very responsive changes in system state to external conditions or for conditions that require rapid decision making for controlling hazardous situations. The implementation of full autonomy is often costly and is often unable to handle unforeseen or highly uncertain environments. Supervised autonomy, with human operators able to initiate autonomous states in a system, provides the benefits of a responsive autonomous local controller, with the flexibility provided by human teleoperators.

The operation of the capture mechanism will now be described with reference to the feature on the spacecraft being captured as being a Marman flange 39 (but any other suitable feature could be grasped as well). The mechanism 100 will be manoeuvred into position above the target Marman flange 39 by a manipulator arm (not shown) of suitable configuration or even by manoeuvering a spacecraft to which the mechanism 100 is directly attached. The arm or spacecraft will be guided by signals returned from a vision system attached to or near the capture mechanism in response to human commands given from the ground, from a spacecraft attached to the arm, autonomously via a computer control system connected to the arm or spacecraft or a combination of both human and computer control.

When the control system has determined that the target flange 39 is within the capture envelope, the arm or spacecraft is commanded to move the mechanism forward until the mechanism is triggered. The mechanism may be triggered electronically via a contact or noncontact sensor or mechanically. In this embodiment, the mechanism is triggered mechanically.

FIGS. 1 and 3 show the mechanism in the armed configuration. The mechanism is in the "armed" or "ready to capture" position when the capture mechanism cams 21 are held in the aft position by two cam drive springs 36 (also seen only in FIG. 9) which are attached to the two cam drive links 22 (seen only in FIG. 9). These springs keep the trigger plunger 4 pushed forward and keep the capture mechanism cams 21 pulled back within the tool. This forces the two jaws 5 and 6 to the open position. The mechanism is triggered when the trigger plunger 4 is forced back within the tool by the contact forces that occur when the mechanism is forced into the target flange 39 as shown in FIG. 5. As the trigger plunger 4 moves aft within the mechanism, the attached plunger drive pin 23 (shown in FIG. 7) forces the two cam drive links 22 to rotate about the cam drive link pivot pins 24. This motion is resisted by the cam drive springs 36 until a point where the cam drive links 22 go over centre. At that point the cam drive springs 36 try to pull the cam drive spring support pins 25 closer together causing the cam drive links 22 to rotate around the cam drive link pivot pins 24.

As the cam drive links 22 rotate they push the capture mechanism cams 21 forwards within the cam slots 42. The cam follower surfaces 41 on the capture mechanism cams push on the cam contact surface 43 on the single and double jaws 5 and 6 and this forces the jaws together, trapping the target flange 39. At the same time the trigger plunger is forced aft by the cam drive springs. Sensors can be positioned within mechanism body to sense when the trigger plunger 4 has moved to provide an indication to the control system that the mechanism has been triggered. A slot 44 in the trigger plunger permits the plunger to move around the fixed plunger draw bar 27.

FIG. 2 shows the mechanism in the closed, but not rigidised configuration. The target flange is considered "soft captured". After soft capture has been achieved the mechanism has to be rigidised to achieve the full structural interface with the target spacecraft 40. In this embodiment, the actuator that rigidises the mechanism is a motor contained within the tool but that actuator could be any other type of mechanical actuation, be it springs, gas generator, paraffin actuator, solenoid or even a motor in a remote location connected by a powertrain of some sort.

To rigidise the mechanism after soft capture the control system commands the motor 9 to turn which, via the gearbox 10 and collet 11 turns the rigidisation drive shaft 12. The rigidisation drive shaft 12 turns within the rigidisation drive nut 13 which then draws the motor 9 and its motor brackets 8 further aft into the rigidisation mechanism housing 3. The rigidisation mechanism housing 3 is connected to the plunger draw bar 27 and pulls the draw bar back with it as it moves. The plunger draw bar 27 moves within slot 44 in the trigger plunger 4. The motor 9 pulls the draw bar aft until it contacts the rigidisation preload bushing 30 which is connected through the rigidisation preload spring 31, rigidisation preload washer 32 and rigidisation preload spring screw 33 to the trigger plunger 4. The rigidisation preload spring ensures that excessive tensile forces are not imposed on the rigidisation components.

The two, connected capture mechanism frames 34 are free to move within the capture mechanism housing 1. As the trigger plunger is pulled aft by the motor it applies more torque to the two cam drive links 22 forcing the capture mechanism cams 21 even further forwards which grasps the Marman flange 39 even more securely and centres it within the jaws. Once the cams are as far forward as possible (limited by the flexibility of the jaws, the wedge angle that the closed jaws make and the forward force on the cams) the rigidisation actuator starts to pull the entire capture mechanism (jaws, frames and cams) and the captured Marman flange 39 aft via the trigger plunger 4. The motor continues to pull the Marman flange aft until the surface of the Marman flange contacts the front face of the two rigidisation brackets 7. Once contact has been made, the motor 9 continues to pull the quick grasp mechanism in housing 1 aft until the control system senses, in this case, via current sensing and counting the number of drive shaft turns, that the Marman flange 39 has been drawn against the rigidisation brackets 7 with the specified amount of force. The mechanism is now considered fully rigidised with the Marman bracket 39 and spacecraft 40 rigidised against the brackets 7.

To reset the mechanism, the motor 9 is reversed and the draw bar 27 moves forwards in slot 44 until it contacts the front of the slot and starts to push the trigger plunger forwards. As the load is removed from the capture mechanism frames 34 the two capture mechanism return springs 20 move the entire quick grasp mechanism in housing 1 forward and the Marman flange 39 is moved off of the rigidisation brackets 7, yet is still captured by the jaws 5 and 6 in their fully closed position. The quick grasp mechanism contained in housing 1 continues to move forward until the capture mechanism frames 34 come in contact with the capture mechanism stop pins 18 which inhibit further forward movement of the quick grasp mechanism. The motor 9 continues to drive the trigger plunger 4 forward and this causes the plunger drive pin 23 to cause the cam drive links 22 to rotate and pull the two capture mechanism cams 21 aft. As the capture mechanism cams 21 move aft, first the load on the Marman flange 39 reduces and, towards the very end of cam travel, the shape of the cam follower surfaces 43 causes the jaws to open and mechanism is completely disengaged from the Marman flange 39. With the capture mechanism frames 34 fully forward, the motor 9 continues to drive the trigger plunger 4 forward until the plunger reset stop ring 38 contacts the aft face of the capture mechanism frames 34. At this point the cam drive links have moved back over centre and are cocked and ready to be activated again. The increase in motor current as the motor stalls indicates to the control system that the mechanism is at the reset point. The motor is stopped and then commanded to pull the trigger plunger aft a predetermined amount to a point where, when the plunger is triggered and quickly moves aft slot 44 will not hit the front face of the draw bar 27. The mechanism is now completely reset and ready to capture another target flange.

Thus, the present spacecraft capture mechanism is for capturing a rail and or flange feature on a free flying spacecraft. The mechanism includes a capture mechanism including a two stage grasping tool. The grasping tool includes a quick grasp mechanism mounted for movement in housing 1, which is configured to clamp the feature when the feature is in close proximity to, and triggers the quick gasp mechanism to soft capture the feature (shown as Marman flange 39 in the figures). The quick grasp mechanism includes jaws 5 and 6, and associated cam mechanism located in housing 1. The capture mechanism includes a rigidizing mechanism located in housing 2 configured to draw the quick grasp mechanism and soft captured feature into housing 1 till the feature abuts against a rigidisation surface located in the first housing to rigidize the feature and spacecraft against housing 1. As shown in FIGS. 1 to 8 the rigidizing mechanism includes a pulling mechanism connected to the elongate plunger 4 configured to draw the elongate plunger 4 and the clamping jaws 5 and 6 further into the first housing section 1, the first housing section 1 and the cam mechanism being configured so that as the clamping jaws 5 and 6 are withdrawn into the first housing section 1 the cam portions engaging the clamping jaws 5 and 6 are biased closer together. The pulling mechanism is configured to further pull the clamping mechanism into the first housing 1 until a portion of the bracket abuts up against rigidisation brackets 7 to thereby rigidiize the captured spacecraft to the capture mechanism.

A non-limiting embodiment of the pulling mechanism includes motor 9, gear box 10 and collet 11. The motor 9 is coupled to the trigger plunger 4 by the motor brackets 8 which are coupled through the plunger draw bar 27 to trigger plunger 4 and to the rigidisation mechanism housing 2 through the rigidisation drive shaft 12 and the rigidisation drive nut 13.

Quicker-Acting Capture Mechanism

Figure 13:
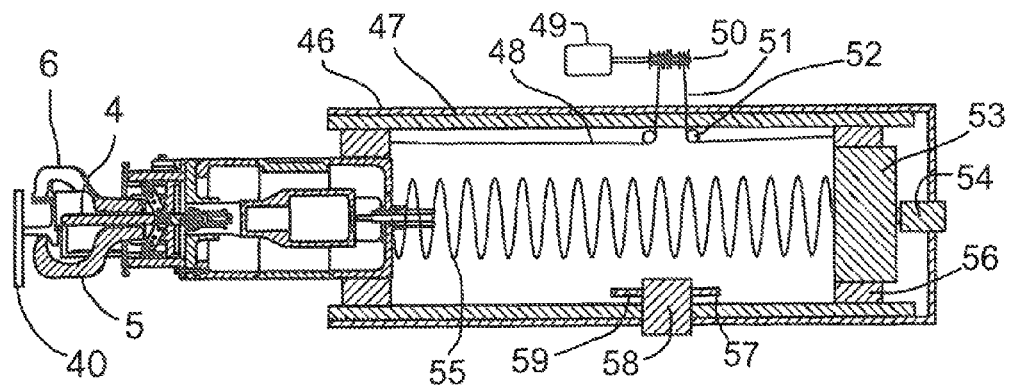
FIG. 13 is a cross sectional view of the capture mechanism of FIG. 11 in the sprung position with the clamping jaws gripping and closed on a Marman flange.
Figure 14:
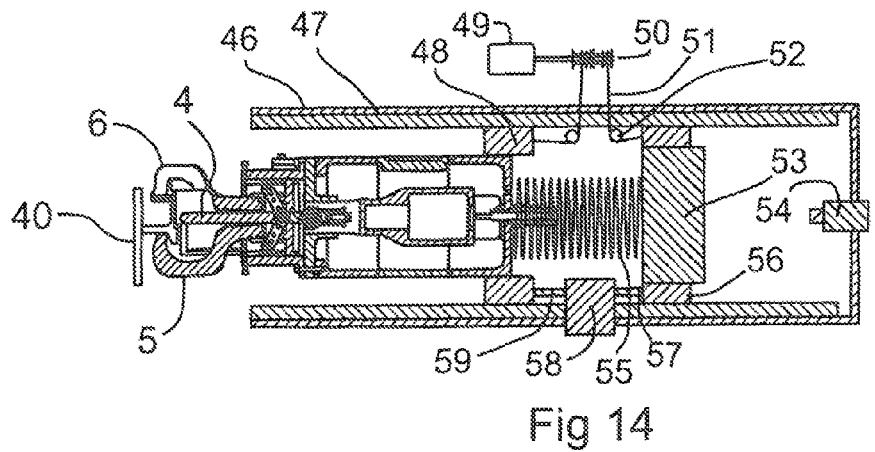
FIG. 14 is a cross sectional view of the capture mechanism of FIG. 11 in the retracted and locked position with the clamping jaws gripping and closed on a Marman flange.

A further embodiment increases the capture speed of the device by adding an additional mechanism. This third mechanism holds the capture mechanism illustrated in FIG. 1 and couples it with a spring and, if required by spacecraft dynamics consideration, also couples it to a recoil mass to limit the reaction forces on the host spacecraft when the mechanism activates. The device is comprised of the following components shown in FIGS. 12, 13 and 14:

45. capture mechanism assembly similar to that shown in FIG. 1.
46. main housing
47. linear bearing (qty 2 req'd)
48. capture mechanism support carriage
49. reset actuator
50. reset cable spool (qty 2 req'd)

Figure 12:
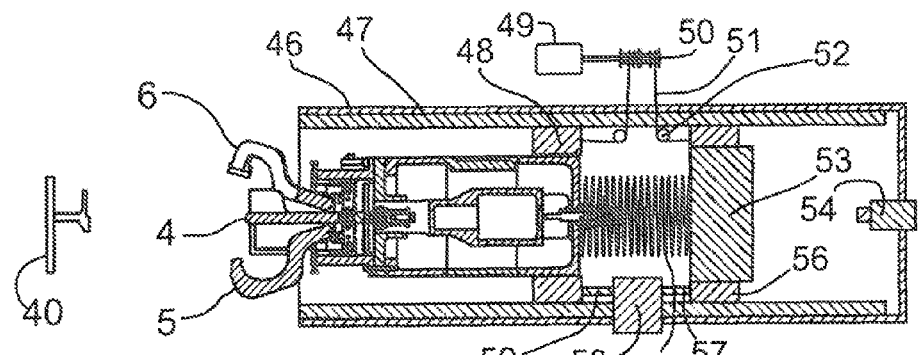
FIG. 12 is a cross sectional view of an alternative embodiment of a capture mechanism in the loaded position with the clamping jaws open and ready to grasp a Marmanm flange.

51. reset cable (qty 2 req'd)
52. reset cable idler (qty 2 req'd)
53. recoil mass
54. recoil damper
55. reciprocation spring
56. recoil mass support carriage
57. recoil mass release arm
58. mechanism release actuator
59. capture mechanism release arm FIG. 12 shows the device armed and ready to be activated. Similar to the previous embodiment, this version must be placed in a position where the target spacecraft 40 and its Marman flange 39 are within the mechanism's capture envelope by an arm or by the host spacecraft's control system. Again, this can be accomplished via direct ground control, on board autonomous computer control or by an advantageous combination of the two. Once the target Marman flange is within the envelope of the device the control system commands the mechanism release actuator 58 to simultaneously release the capture mechanism assembly 45 and the recoil mass 53. The capture mechanism is pushed forward a prescribed distance and the Recoil Mass is pushed backwards at the same time. The capture mechanism assembly is supported by the capture mechanism support carriage 48 and the recoil mass is supported by the recoil mass support carriage 56. Both support carriages run on a set of aligned linear bearings 47 that guide the axial movement of the two sub-assemblies and connect the support carriages to the main housing 46.

As the capture mechanism assembly reaches approximately the end of its travel, and if the computations regarding the future position of the target flange were correct when the device was triggered, then trigger plunger 4 on the capture mechanism assembly will strike the surface of the target flange and initiate the capture sequence outlined above. At the same time, the recoil mass has hit the end of its travel and to provide a final protection against impact shock (which can be harmful to delicate spacecraft components) comes into contact with the recoil damper 54 which absorbs almost all of any remaining deceleration forces and brings the recoil mass to a stop. A series of one-way brakes in the recoil mass support carriage help prevent the recoil mass from rebounding back down the linear bearings in an uncontrolled manner. These brakes can be of the limited slip type which would permit the recoil mass to slowly move back towards the reset position or they can be rigid brakes permitting the actions of the various elements to be controlled individually. As similar set of brakes on the capture mechanism support carriage prevent its uncontrolled rebound when it reaches the end of its travel. If required to limit capture mechanism assembly deceleration shocks a damper similar to the recoil damper can be placed in the path of the capture mechanism assembly.

With the target flange captured in the jaws of the capture mechanism assembly, the capture mechanism support carriage is locked to the linear bearings and the capture mechanism assembly rigidises its grasp of the target flange as described for the basic mechanism, above. Once the target is held rigidly in the grasp of the mechanism the capture mechanism assembly may be pulled back into the device. Resetting the device is accomplished by engaging the reset actuator 49, which, in this case is a motor gearbox but could as well be a clockwork, a shape memory alloy actuator, a paraffin actuator or any number of other acceptable actuators that serve to draw the capture mechanism assembly and the recoil mass back towards their initial position. In this case the reset actuator turns two reset cable spools 50 which draw in the two reset cables 51 that are attached to the two support carriages. Once the capture mechanism support carriage and the recoil mass support carriage reach the point where the reciprocation spring has achieved the correct amount of compression necessary to activate the device for the next capture attempt, the two support carriages are locked into the linear bearings and the capture mechanism release arms 59 re-engage connecting the mechanism release actuator to the two support carriages.

As a last step, the rotation of the reset spools 50 is uncoupled from the reset actuator 49 by means of a clutch or released brake (not shown) so that the reset spools may quickly pay out cable the next time that capture is initiated. The capture mechanism is now reset and ready to make another capture operation. The jaws of the capture mechanism can be opened independently of the capture action so that the target satellite can be released without initiating the reciprocating action.

There may be operational considerations that require that the target satellite be held without rigidising while the capture mechanism assembly and this sequence of events can be supported by the device by simply changing the sequence in which the actuators are commanded. Similarly, by leaving the reset actuator coupled to the reset spools it can be used to slowly pay out the capture mechanism assembly as opposed to the rapid capture action, should that prove advantageous.

By controlling the various masses and any braking or drag forces being applied by the two support carriages to motion down the linear bearings, the speeds and accelerations of the mechanism can be fine-tuned. If actuators are included in the support carriages, this fine-tuning can take place during the capture event permitting a significant level of control over the capture event.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A system for capturing a feature on a free flying spacecraft, comprising
   a capture mechanism including a two stage grasping tool including
   i) a quick grasp mechanism having clamping jaws configured to be sprung closed, said quick grasp mechanism being mounted for movement in a housing, said quick grasp mechanism configured to clamp said feature when said feature is in close proximity to, and triggers said clamping jaws to be sprung quickly and sufficiently shut such that the feature cannot escape from said clamping jaws thus achieving soft capture of the feature; and
   ii) a rigidizing mechanism, independently actuated from said quick grasp mechanism and configured to, upon completion of the soft capture of the feature, draw the quick grasp mechanism and the soft captured feature into said housing until said soft captured feature abuts against a rigidisation surface located in said housing to rigidize the soft captured feature and spacecraft relative to said housing.

2. The system according to claim 1, further comprising
   a) a positioning mechanism releasably attachable to the capture mechanism capable of positioning the capture mechanism into close proximity to the feature to trigger the quick grasp mechanism; and
   b) a sensing system for ascertaining a relative position of the capture mechanism and the feature.

3. The system according to claim 1 including a computer control system connected to said sensing system and said positioning mechanism and programmed to position the capture mechanism in close proximity to said feature to trigger said quick grasp mechanism.

4. The system according to claim 3 wherein said computer control system is further programmed to control the actions of said quick grasp and ridigizing mechanisms.

5. The system according to claim 3 including a second computer control system programmed to control the actions of said quick grasp and ridigizing mechanisms.

6. The system according to claim 3 further comprising a communication system configured to provide communication between a command and control system and a remote operator for remote teleoperator control, supervised autonomous control, or fully autonomous control of fluid transfer operations between the servicer spacecraft and the client satellite.

7. The system according to claim 6 wherein said sensing system includes a vision system mounted and configured to provide real time images of all capture and release operations, said vision system being connected to said communication system for transmitting said images to a teleoperator during teleoperation.

8. The system according to claim 6 wherein said sensing system includes a vision system mounted and configured to provide real time images of all fluid transfer operations, said vision system being connected to said communication system for transmitting said images and being configured to be used in an autonomous control system.

9. The system according to claim 1 wherein said capture mechanism includes a first housing section in which said quick grasp mechanism is mounted, said
   clamping jaws having proximal sections pivotally mounted to a front portion of said first housing section and extending outwardly from a front of said first housing section,
   a biasing mechanism located in said first housing section configured for biasing distal sections of the clamping jaws apart, the biasing mechanism including an elongate plunger mounted for reciprocal movement along an axis of the first housing section, the biasing mechanism including a cam mechanism pivotally mounted to said elongate plunger and configured to have a cam portion engage said clamping jaws to bias the distal sections of the clamping jaws apart when the elongate plunger is fully extended forward of the first housing section, the cam mechanism being configured so that when the elongate plunger contacts a bracket mounted to a spacecraft and is moved inwardly into said first housing section the cam mechanism pivots with respect to said elongate plunger causing the cam portions engaging said clamping jaws to move forward forcing the distal ends of the clamping jaws to pivot toward each other thereby capturing a portion of the bracket; and
   said rigidisation mechanism being mounted in a second housing section, said second housing section mounted to a back of said first housing section, said rigidisation mechanism including
   a pulling mechanism connected to the elongate plunger configured to draw the elongate plunger and the clamping jaws further into the first housing section, the first housing section and cam mechanism being configured so that as the clamping jaws are withdrawn into the first housing section the cam portions engaging said clamping jaws are biased closer together, the pulling mechanism being configured to further pull the clamping mechanism into said first housing until a portion of the bracket abuts up against a rigidisation bracket to thereby rigidiize the captured spacecraft to the capture mechanism.

10. A capture mechanism for capturing a bracket mounted to a spacecraft, comprising:
   a) a first housing section, a quick grasp mechanism mounted in said first housing section, said quick grasp mechanism including
      clamping jaws having proximal sections pivotally mounted to a front portion of said first housing section and extending outwardly from a front of said first housing section,
      a biasing mechanism located in said first housing section configured for biasing distal sections of the clamping jaws apart, the biasing mechanism including an elongate plunger mounted for reciprocal movement along an axis of the first housing section, the biasing mechanism including a cam mechanism pivotally mounted to said elongate plunger and configured to have a cam portion engage said clamping jaws to bias the distal sections of the clamping jaws apart when the elongate plunger is fully extended forward of the first housing section, the cam mechanism being configured so that when the elongate plunger contacts a bracket mounted to a spacecraft and is moved inwardly into said first housing section the cam mechanism pivots with respect to said elongate plunger causing the cam portions engaging said clamping jaws to move forward forcing the distal ends of the clamping jaws to pivot toward each other thereby capturing a portion of the bracket; and
   b) a second housing section mounted to a back of said first housing section, a rigidisation mechanism mounted in said second housing section, said rigidisation mechanism including
      a pulling mechanism connected to the elongate plunger configured to draw the elongate plunger and the clamping jaws further into the first housing section, the first housing section and cam mechanism being configured so that as the clamping jaws are withdrawn into the first housing section the cam portions engaging said clamping jaws are biased closer together, the pulling mechanism being configured to further pull the clamping mechanism into said first housing until a portion of the bracket abuts up against a rigidisation bracket to thereby rigidiize the captured spacecraft to the capture mechanism.

* * * * *